Patented Aug. 16, 1938

2,127,202

UNITED STATES PATENT OFFICE 2,127,202

RUST INHIBITING COMPOSITION

Clete L. Boyle, Detroit, Mich.

No Drawing. Application June 16, 1936,
Serial No. 85,553

1 Claim. (Cl. 148—6)

This invention relates to the art of treating metal surfaces to render them rust inhibitive.

An important object of this invention is to provide an inexpensive, rapid process for treating metal surfaces, particularly iron and steel, and rendering them rust inhibitive. This process is primarily intended for use in preparing metal for paint, lacquer and enamel coatings. The process consists essentially of treating metal surfaces with a solution which deposits a rust inhibiting film thereover. Upon application of a priming or other coat of paint to the treated metal surface it becomes substantially immune to the action of rust.

Hithertofore, in wet processes of this character it has been the practice to refrain from using agents which by themselves stimulate the production of rust. Certain salts have this characteristic property. Common table salt or sodium chloride is an important example of one of these. The propensity of sodium chloride and other salts of strong mineral acids to attack metal and cause the formation of rust is well known. Yet I have found that salts of this nature can successfully be used in a preparation for treating metal to prevent the formation of rust thereon. In this preparation the salt used cooperates to produce the unexpected result of inhibiting rust formation.

I have found that when chromium, either in acid or salt form such as chromium trioxide, is mixed with the salt of a strong mineral acid, in solution, a very excellent composition is produced which when spread upon a metal surface will impart rust inhibiting properties thereto. The chromium is mixed with the salt in certain prescribed proportions and both are dissolved in water to form a solution.

Certain organic compounds accelerate the action of the salt and chromic acid solution on metal surfaces. Many hydrocarbons of the aromatic series such as the derivatives of the higher boiling fractions of coal tar function in such a manner. More specifically, the phenols, naphthalenes, cresols and anthracenes are particularly beneficial agents in the solution. A small percentage or trace of any one of these accelerating agents is all that is necessary in the solution.

In preparing the solution, I prefer to mix sodium chloride and chromic acid in substantially the proportions of 2 to 1, respectively. Other salts may be substituted for the sodium chloride such as the sulphates, phosphates, nitrates, chlorates, et cetra, but I prefer NaCl because of its abundance and cheapness. Calcium chloride may be substituted, if desired, as it is relatively inexpensive. The salt and the chromic acid are dissolved in a suitable amount of water as hereinafter set forth.

The formulas which I prefer to use are by weight:

Formula I

| | Per cent |
|---|---|
| NaCl | 66 |
| CrO$_3$ | 33 |
| Cresylic acid | 1 |

Formula II

| | Per cent |
|---|---|
| NaCl | 66 |
| CrO$_3$ | 33 |
| Naphthalene | 1 |

The relative percentage of the salt and the chromium compound may be varied. The percentage of salt may vary from 50% to 74% and the percentage of chromium acid may correspondingly vary from 49% to 25%. The accelerating agent may remain the same at 1% of the total mass or may be correspondingly varied as desired.

This mixture may then be dissolved in water. One or two ounces per gallon of water forms a desirable solution for use.

Instead of using salt and chromic acid, substantially the same solution can be achieved by mixing Na$_2$CrO$_4$, HCl and one of the so called catalysts or accelerators. For example, a solution containing chromium, sodium, and chlorine ions in substantially the same proportion as that of Formula Nos. 1 and 2 can be obtained by mixing 7.7 grams of Na$_2$CrO$_4$ in 8.5 c. c. of HCl (35% strength). One drop of either one of the above specified catalysts or accelerators will complete the solution. Solutions of larger amounts can be prepared in this way but I prefer to use the formulas set forth above because the ingredients are relatively inexpensive to obtain.

Preferably the metal is cleaned of oil, grease, and other foul material before the solution is applied thereto. I prefer to apply the solution to the metal in heated condition. The temperature of the solution may be anywhere bewteen 170° and 200° Fahrenheit but I prefer a temperature between 180° and 190°. The metal object to be treated may be dipped in the hot solution for approximately one minute or longer. Instead of dipping, the metal surface may be sprayed with the solution for a period of time equivalent to an immersion of one minute in the solution. After the period for applying the solution has elapsed, the excess portion of the solution on the surface is rinsed off preferably with hot water and the metal surface is allowed to dry. That part of the solution which remains forms a rust inhibiting seal or coating over the surface of the metal, and paint coats can be immediately applied.

What I claim:

A preparation for treating metal preparatory to painting comprising sodium chloride and chromic acid in substantially the proportions of 2 to 1 by weight and substantially 1% cresylic acid.

CLETE L. BOYLE.